(12) United States Patent
Evers et al.

(10) Patent No.: US 8,770,507 B2
(45) Date of Patent: Jul. 8, 2014

(54) SELF-LOCKING BELT RETRACTOR

(75) Inventors: Uwe Evers, Glückstadt (DE); Ronald Jabusch, Elmshorn (DE); Barbara Hantel, Elmshorn (DE)

(73) Assignee: Autoliv Development AB, Vårgårda (SE)

( * ) Notice: Subject to any disclaimer, the term of this patent is extended or adjusted under 35 U.S.C. 154(b) by 209 days.

(21) Appl. No.: 13/509,439

(22) PCT Filed: Nov. 2, 2010

(86) PCT No.: PCT/EP2010/006682
§ 371 (c)(1),
(2), (4) Date: Jun. 21, 2012

(87) PCT Pub. No.: WO2011/057732
PCT Pub. Date: May 19, 2011

(65) Prior Publication Data
US 2012/0256032 A1    Oct. 11, 2012

(30) Foreign Application Priority Data

Nov. 11, 2009   (DE) .......................... 10 2009 052 495

(51) Int. Cl.
*B60R 22/40*        (2006.01)
(52) U.S. Cl.
USPC ..................................... 242/384.5; 242/384.6
(58) Field of Classification Search
USPC ..................................... 242/384, 384.5–384.6
See application file for complete search history.

(56) References Cited

U.S. PATENT DOCUMENTS

| 3,758,044 A | 9/1973 | Nilsson |
| 3,901,459 A | 8/1975 | Romanzi et al. |
| 3,911,391 A | 10/1975 | Held et al. |
| 3,926,384 A | 12/1975 | Weman |
| 3,981,518 A | 9/1976 | Pulling |

(Continued)

FOREIGN PATENT DOCUMENTS

| CA | 1160604 | 1/1984 |
| DE | 298 22 610 | 5/1999 |

(Continued)

OTHER PUBLICATIONS

PCT International Search Report—Jan. 5, 2011.

(Continued)

*Primary Examiner* — Sang Kim
(74) *Attorney, Agent, or Firm* — Brinks Gilson & Lione

(57) ABSTRACT

A self-locking belt retractor has a vehicle-sensitive controlled blocking system in which a mass (14) moves a locking lever (17) engaged in the toothing (29) of a controlled disk. The sensor mass (14) is fitted in a holder part (10) on a support surface (23) that can be tilted in case of vehicle accelerations, the locking lever (17) on the end (19) facing away from the engaging tip (18) being connected to the sensor mass (14) in a form-fitting manner and forming a support (21). A form fit occurs in an extension (15) of the sensor mass (14) which protrudes through a hole (33) in the contact surface (23) of the holder part (10). A projection (31) projecting into a hole (33) is provided at the border of the hole (33) facing the locking lever (17) that is contacted by the locking lever (17) in case of a deflection.

6 Claims, 4 Drawing Sheets

(56) References Cited

U.S. PATENT DOCUMENTS

| | | | |
|---|---|---|---|
| 4,097,699 | A | 6/1978 | Larson |
| 4,135,683 | A | 1/1979 | Stephenson et al. |
| 4,164,336 | A | 8/1979 | Higbee et al. |
| 4,231,591 | A * | 11/1980 | Close .................... 280/806 |
| 4,262,858 | A | 4/1981 | Takada |
| 4,314,680 | A | 2/1982 | Takada |
| 4,329,549 | A | 5/1982 | Breed |
| 4,382,564 | A | 5/1983 | James |
| 4,391,420 | A | 7/1983 | Ahad et al. |
| 4,399,955 | A | 8/1983 | Miskowicz et al. |
| 4,410,875 | A | 10/1983 | Spies et al. |
| 4,413,794 | A * | 11/1983 | Weman ................ 242/384.5 |
| 4,420,127 | A | 12/1983 | Kondziola et al. |
| 4,458,920 | A | 7/1984 | Ozaki |
| 4,470,556 | A | 9/1984 | Matsuoka |
| 4,484,041 | A | 11/1984 | Andres et al. |
| 4,534,521 | A | 8/1985 | Sylvén |
| 4,608,501 | A | 8/1986 | Andres et al. |
| 4,638,179 | A | 1/1987 | Mattes et al. |
| 4,639,563 | A | 1/1987 | Gunther |
| 4,827,091 | A | 5/1989 | Behr |
| 4,844,374 | A | 7/1989 | Mori |
| 4,879,906 | A | 11/1989 | Meline et al. |
| 4,889,068 | A | 12/1989 | Tabata et al. |
| 4,898,033 | A | 2/1990 | Yamamoto |
| 4,915,411 | A | 4/1990 | Norton |
| 4,936,601 | A | 6/1990 | Tada |
| 4,955,638 | A | 9/1990 | Kinoshita et al. |
| 4,985,835 | A | 1/1991 | Sterler et al. |
| 5,005,861 | A | 4/1991 | Breed et al. |
| 5,011,182 | A | 4/1991 | Husby et al. |
| 5,100,169 | A | 3/1992 | Goor et al. |
| 5,177,370 | A | 1/1993 | Meister |
| 5,184,844 | A | 2/1993 | Goor |
| 5,261,506 | A | 11/1993 | Jost |
| 5,271,639 | A | 12/1993 | Nishizawa |
| 5,375,908 | A | 12/1994 | Goor |
| 5,388,464 | A | 2/1995 | Maddison |
| 5,390,952 | A | 2/1995 | Goor |
| 5,430,334 | A | 7/1995 | Meister |
| 5,449,198 | A | 9/1995 | Jeenicke et al. |
| 5,485,041 | A | 1/1996 | Meister |
| 5,526,996 | A | 6/1996 | Ebner et al. |
| 5,562,259 | A | 10/1996 | Kielwein |
| 5,562,269 | A | 10/1996 | Protz, Jr. |
| 5,620,203 | A | 4/1997 | Jeenicke et al. |
| 5,622,327 | A | 4/1997 | Heath et al. |
| 5,622,383 | A | 4/1997 | Kielwein et al. |
| 5,636,807 | A | 6/1997 | Warrick |
| 5,687,926 | A | 11/1997 | Park et al. |
| 5,706,181 | A | 1/1998 | Dirmeyer et al. |
| 5,848,758 | A | 12/1998 | Ernst |
| 5,882,084 | A | 3/1999 | Verellen et al. |
| 5,895,071 | A | 4/1999 | Norton |
| 5,950,952 | A | 9/1999 | Koketsu |
| 6,139,053 | A | 10/2000 | Knox |
| 6,164,581 | A | 12/2000 | Freeman et al. |
| 6,230,997 | B1 | 5/2001 | Palliser |
| 6,283,553 | B1 * | 9/2001 | Anderson et al. ............. 297/478 |
| 6,299,093 | B1 | 10/2001 | Harte et al. |
| 6,386,472 | B1 | 5/2002 | Rogers, Jr. |
| 6,435,442 | B1 | 8/2002 | Kielwein et al. |
| 6,547,175 | B2 | 4/2003 | Kielwein et al. |
| 6,647,788 | B2 | 11/2003 | Murai et al. |
| 6,802,470 | B2 | 10/2004 | Smithson et al. |
| 7,013,736 | B2 | 3/2006 | Knox |
| 2005/0247135 | A1 | 11/2005 | Knox |
| 2006/0243846 | A1 | 11/2006 | Clute |
| 2008/0217457 | A1 | 9/2008 | Clute et al. |
| 2008/0217458 | A1 | 9/2008 | Clute et al. |
| 2012/0256032 | A1 | 10/2012 | Evers et al. |

FOREIGN PATENT DOCUMENTS

| | | |
|---|---|---|
| DE | 195 39 619 C2 | 8/2001 |
| DE | 102 30 211 A1 | 1/2004 |
| DE | 10 2004 012 3 | 10/2005 |
| EP | 0 761 513 | 5/2000 |
| GB | 2 157 045 | 10/1985 |

OTHER PUBLICATIONS

German Search Report—Nov. 11, 2009.

* cited by examiner

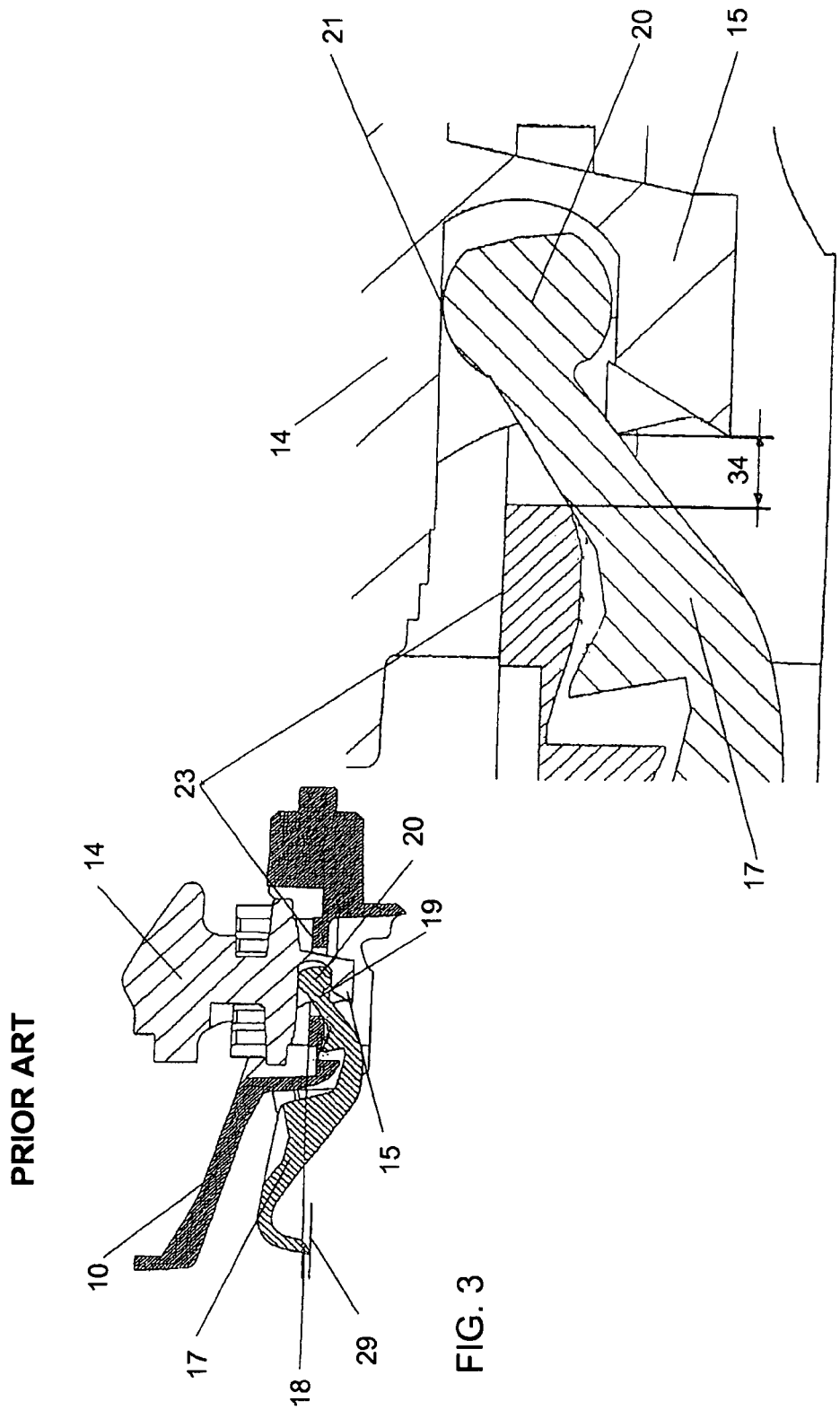

SELF-LOCKING BELT RETRACTOR

CROSS-REFERENCE TO RELATED APPLICATIONS

This application claims priority to German patent application number 10 2009 052 495.9, filed Nov. 11, 2009 and PCT/EP2010/006682, filed Nov. 2, 2010.

FIELD OF THE INVENTION

The invention relates to a self-locking belt retractor having at least one vehicle-sensitive controlled blocking system for the belt winding shaft in which a vehicle-sensitive sensor mass moves a locking lever with its engaging tip engaged with the toothing of a control disk. The control disk is stopped in its rotary movement together with the belt winding shaft and consequently activates the blocking system, the sensor mass being arranged in a vertical position in a holder part on a support surface that can be tilted in the holder part in case of vehicle accelerations.

BACKGROUND OF THE INVENTION

A belt retractor having the general characteristics mentioned above has been described in DE 195 39 619 C2. The locking lever is connected to the sensor mass on the end facing away from the engaging tip in a form-fitting manner and forming a support. The form fit occurs in an extension of the sensor mass which protrudes downwardly through a hole in the contact surface of the holder part.

The problem with such generic belt retractors of the type described above is that in case of major vibrations, e.g. when dropping the belt retractor or when upholstering seats, the sensor lever can be bent with respect to the holder part and to the sensor mass, so that it subsequently no longer complies with the high demands regarding engagement accuracy. Another known problem of belt retractors is that the sensor mass and/or the locking lever carry out relative movements which result in an unwanted noise (buzz, squeak, rattle) in the belt retractor.

The underlying object of the invention therefore is to provide a belt retractor in which the problems mentioned above are prevented.

This object is attained by means of the characteristics of the belt retractor described herein.

The basic concept of the invention is that a projection protruding into the hole is provided at the border of the hole facing the locking lever, against which the locking lever contacts on deflection in one direction. The contact surface of the locking lever on the holder part is enlarged by the proposed projection, and the lever arms, by means of which the locking lever contacts the holder part, are reduced. Owing to the enlarged contact surface and the reduced lever arms, the maximum stress on the locking lever and the associated probability of a deformation of the locking lever during the vibrations or handling of the belt retractor or any other stress on the locking lever is reduced.

Furthermore, the enlarged contact surface, the positional accuracy of the locking lever, of the holder part and of the sensor mass relative to one another are in general improved, which is advantageous for the accuracy of the response threshold of the sensor as well as with regard to the prevention of an unwanted blocking of the belt retractor when the belt retractor is assembled. Another advantage resulting from the invention is that the relative movements of the sensor lever with respect to the holder part and to the sensor mass are limited by the provided projection and the noise in the belt retractor is thus reduced.

It is further proposed that the projection is formed as a tongue projecting into the hole which substantially extends in the longitudinal direction of the locking lever. As a result of the proposed shape of the projection, the lever arm acting between the holder part and the locking lever is significantly reduced, where the lever arm can at the same time be configured to be resilient because of the tongue-shaped projection, so that the stop of the locking lever at the holder part can accordingly be configured to be soft.

It is also proposed that the thickness of the projection decreases toward its free end. Owing to the decreased thickness of the projection, the stress on the locking lever is very low at the start of the contact, so that it cannot, or can only minimally be stressed in case of minor deflections. The spring rigidity of the projection increases with the increasing deflection of the locking lever, so that a correspondingly increased counteracting force is opposed to the deflection of the locking lever.

Another preferred embodiment of the invention is that the locking lever contacts the holder part via a noise-reducing insulating layer. Such an insulating layer can, for example, be realized by means of a soft plastic material, in particular by means of an elastomeric layer. The insulating layer can be arranged at the projection and/or at the contact surface of the locking lever that contacts the projection. What is important is that the insulating layer reduces the noise occurring on contact of both parts.

It is further proposed that a projection be provided at the sensor mass and/or on the holder part for the alignment of the sensor mass in a predefined position and which engages in a recess provided on the other part, respectively. The projection allows for the reliable arrangement of the sensor mass in a predefined alignment on the holder part by means of an automated mounting process, and consequently for the reduction of the error probability of the sensor as a result of a misaligned sensor mass.

In this case, at least one second projection can be provided at the sensor mass and/or on the holder part which engages in another second recess provided on the other part. The probability for the sensor mass to twist under the effect of an impulse is reduced by the second projection, so that the sensor carries out its function even in case of strong vibrations.

The projections should further have a tapered, preferentially triangular cross-sectional surface in the areas engaging in the recesses, as a result of which the sensor mass can swivel in the recesses. It is thus ensured that the sensor mass is kept in the predefined alignment by the projections but without obstructing the swiveling movement.

BRIEF DESCRIPTION OF THE DRAWINGS

The invention will be explained below with reference to several figures. The figures specifically show:

FIG. 3 is a cross-sectional drawing of a prior art vehicle-sensitive sensor;

FIG. 4 is an enlarged detail of a prior art vehicle-sensitive sensor;

DETAILED DESCRIPTION OF THE INVENTION

The basic design of a self-locking belt retractor, in which the advanced vehicle-sensitive sensor according to the present invention can be used, can be found in patent specification DE 195 39 619 C2. The disclosure of that specification shall be deemed, in particular with regard to the function and to the interaction of the vehicle-sensitive sensor with the remaining parts of the belt retractor, to be explicitly incorporated by reference into the disclosure of the present specification. The differences between the prior art vehicle-sensitive sensor (FIG. 1, FIG. 3, FIG. 4) and the advanced vehicle-sensitive sensor according to the present invention are explained in FIGS. 2, 5 and 6.

Figure 1:
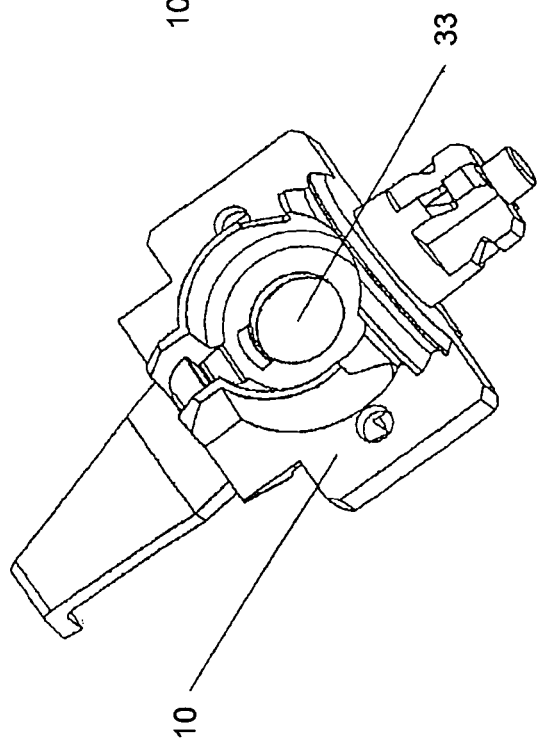
FIG. 1 is a perspective drawing of a prior art holder part.

FIG. 1 is an isometric view of the holder part 10 of the vehicle-sensitive sensor having a hole 33. FIGS. 3 and 4 show a contact surface 23 of the holder part 10 on which a sensor mass 14 is mounted. The sensor mass 14 has a downwardly projecting extension 15 which protrudes through the hole 33 and in which a spherical formation 20 of a locking lever 17 is form-fittingly mounted on a support 21. The spherical formation 20 is situated at the end 19 facing away from the engaging tip 18 of the locking lever 17. The locking lever engages with the engaging tip 18 into the toothing 29 of a control disk, which is not shown, as soon as the sensor mass 14 is moved from its rest position when a predetermined acceleration value is exceeded. With this type of deflection the locking lever 17 contacts the border of the hole 33 of the holder part 10. As a consequence, the border of the hole 33 acts as the stop limiting the deflection of the locking lever 17. The locking lever 17 can bend as described above around this contact point in case of an overload and thus loses contour accuracy. The bending length 34 relevant to this purpose results from the lateral distance between the border of the hole 33 and the border of the extension 15 as shown in FIG. 4.

Figure 2:
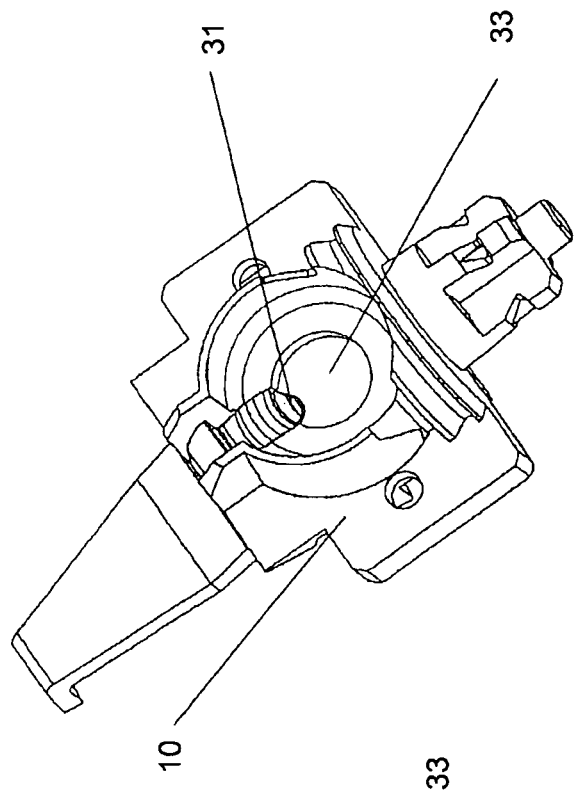
FIG. 2 is a perspective drawing of a holder part with a projection according to the present invention.
Figures 5, 6:
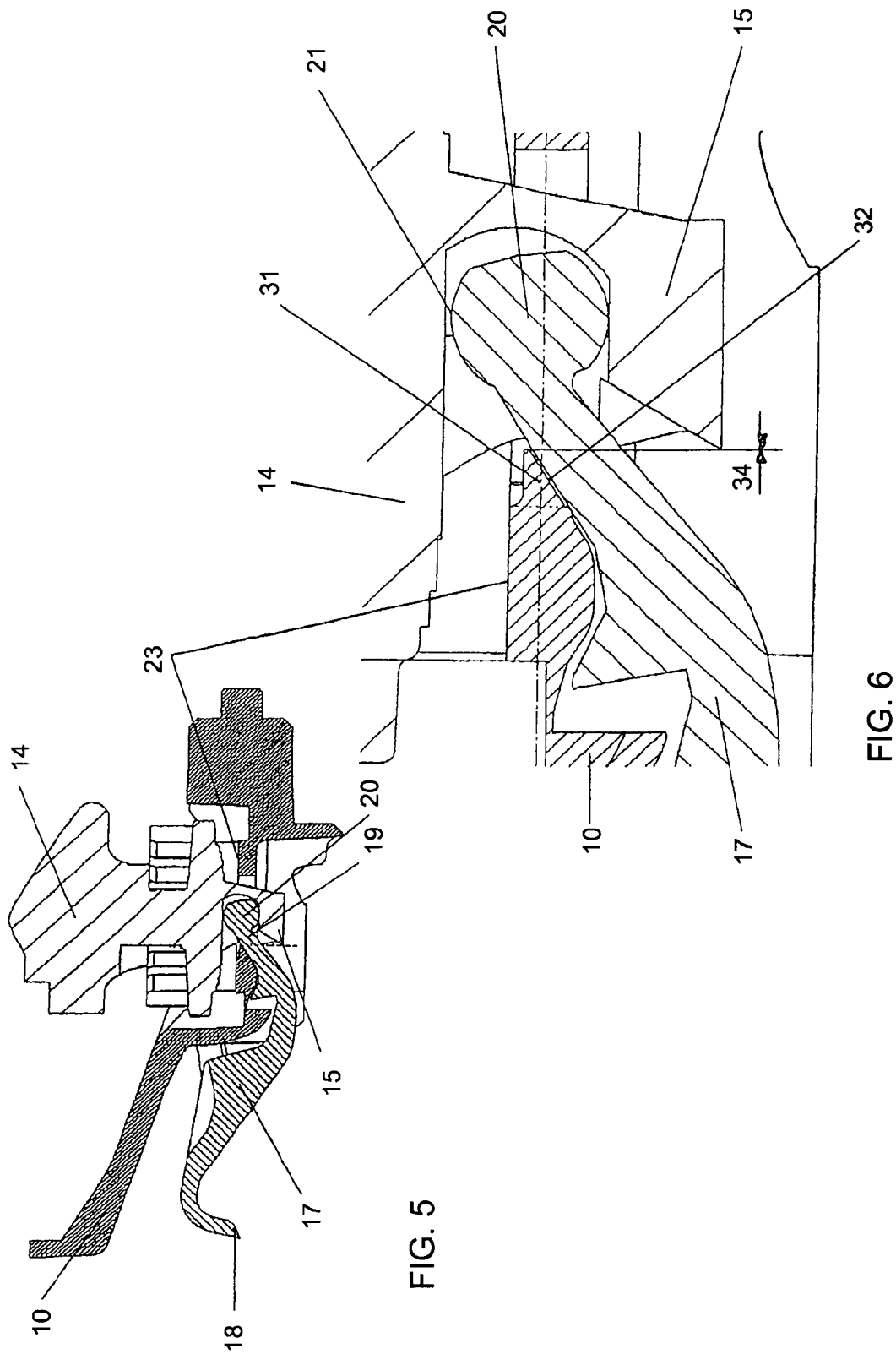
FIG. 5 is a cross-sectional drawing of a vehicle-sensitive sensor with a projection according to the present invention.
FIG. 6 is an enlarged detail of a vehicle-sensitive sensor with a projection according to the present invention.

FIGS. 2, 5 and 6 show the further developed vehicle-sensitive sensor according to the present invention, in which the holder part 10 is formed with a projection 31 projecting into the hole 33. Projection 31 extends inwardly of the circular border of hole 33. Owing to the projection 31, the probability for the locking lever 17 to bend due to the strongly reduced bending length 34 is substantially reduced. Furthermore, an overstroke in the direction of the control disk is prevented by the projection 31 according to the present invention. Overstroke is defined as the excessively deep engagement of the locking lever 17 in the tooth system 29 of the control disk. As a result of the reduced overstroke, the assembly of the self-locking belt retractor is also simplified in general because the module consisting of the holder part 10, the locking lever 17 and the sensor mass 14 can be installed together with the control disk and the housing more easily on account of the reduced maximum deflection angle of the locking lever 17. A larger contact surface 32 between the locking lever 17 and the support part 10 is also realized by the projection 31. This enlarged contact surface 32 and smaller overstroke of the locking lever individually and together counteract the noise generation because the mobility of the locking lever 17 is clearly limited. The noise can further be reduced by providing the contact surface 32 of the projection 31 with an insulating layer and the projection 31 acting with a slight resilience by being tapered to an edge toward its free end.

Figure 7:
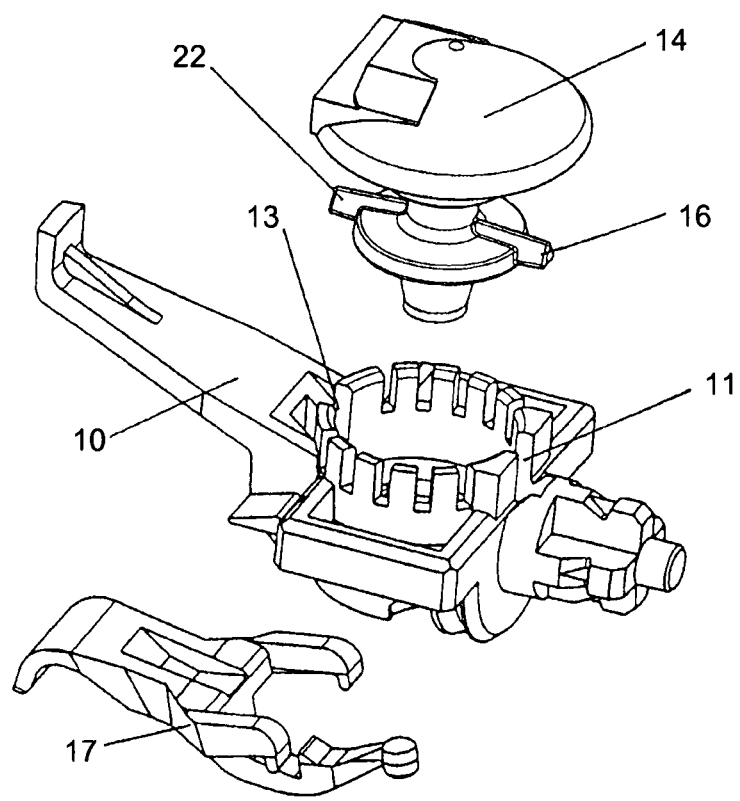
FIG. 7 is a vehicle-sensitive sensor with an inertial mass having a mechanical coding.

FIG. 7 shows a further development of the vehicle-sensitive sensor in which the sensor mass 14 is provided with pin-shaped posts 16 and 22. Recesses 11 and 13 are provided in the holder part 10 which have the same alignment as the posts 16 and 22 at the sensor mass. When the sensor mass 14 is assembled in the support part 10, the sensor mass 14 can only be arranged in a predetermined alignment in the support part 10, into which the posts 16 and 22 engage in the recesses 11 and 13. A post 16 or 22 is necessary so that the sensor mass 14 is arranged in the predetermined alignment in the holder part, while the second post 16 or 22 additionally ensures that the sensor mass 14 is not twisted by external forces. The second post 16 or 22 also contributes to an assembly of the sensor mass 14 with improved reliability.

While the above description constitutes the preferred embodiment of the present invention, it will be appreciated that the invention is susceptible to modification, variation, and change without departing from the proper scope and fair meaning of the accompanying claims.

The invention claimed is:

1. A self-locking belt retractor having at least one vehicle-sensitive controlled blocking system for a belt winding shaft in which a vehicle-sensitive sensor mass (14) has an engaging tip (18) that moves a locking lever (17) and is engaged in a toothing (29) of a control disk when activated, so that the control disk is stopped in its rotary motion together with the belt winding shaft and consequently activates the blocking system, the sensor mass (14) being arranged in a vertical position in a holder part (10) on a support surface (23) that can be tilted in the holder part (10) in response to vehicle accelerations, the locking lever (17) being coupled with the sensor mass (14) on an end (19) facing away from the engaging tip in a form-fitting manner and forming a support (21), the form fit occurring in an extension (15) of the sensor mass (14) which protrudes through a hole (33) in the contact surface (23) of the holder part, the hole (33) having a border facing the locking lever (17) and forming a projection (31) projecting radially inwardly through a circle formed by the hole (33), the projection being contacted by the locking lever (17) when the sensor mass (14) is activated.

2. The belt extractor according to claim 1, wherein the projection (31) is configured as a tongue projecting into the hole (33), the tongue extending in a longitudinal direction of the locking lever (17).

3. The belt extractor according to claim 1, wherein the projection (31) has a thickness that decreases to an edge toward its free end.

4. The belt extractor according to claim 1, wherein on one of the sensor mass (14) and the holder part (10) a post (16) is arranged for an alignment of the sensor mass (14) in a predefined position, the post engaging into a recess (11) on the other one of the sensor mass (14) and the holder part (10).

5. The belt extractor according to claim 4, wherein at least one projection (22) is arranged on one of the sensor mass (14) and the holder part (10) that engages into a recess (13) on the other one of the sensor mass (14) and the holder part (10).

6. The belt extractor according to claim 4, wherein a pair of the posts (16, 22) are provided having a tapered cross-sectional surface in the areas engaging into the recesses (11, 13), as a result of which the sensor mass (14) can swivel in the recesses (11, 13).

* * * * *